Nov. 24, 1959   E. C. GROGAN   2,914,077
AIR-PRESSURE-ACTUATED, CYCLICALLY OPERATING CONTROLLER
Filed May 11, 1956   11 Sheets-Sheet 1
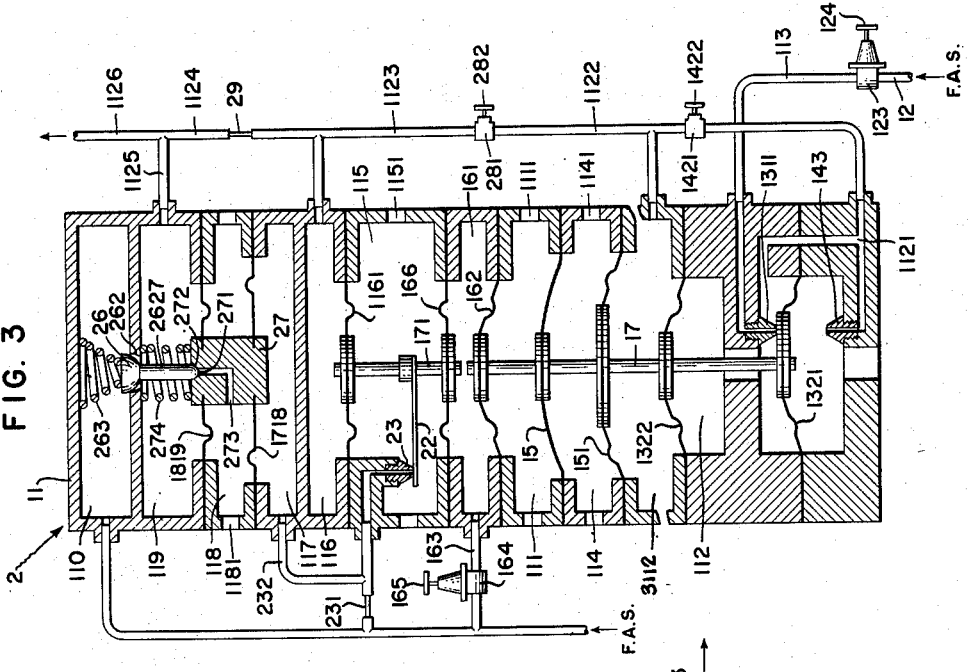
INVENTOR.
EDWARD C. GROGAN
BY
*Arthur H. Swanson*
ATTORNEY.

Nov. 24, 1959 E. C. GROGAN 2,914,077
AIR-PRESSURE-ACTUATED, CYCLICALLY OPERATING CONTROLLER
Filed May 11, 1956 11 Sheets-Sheet 2
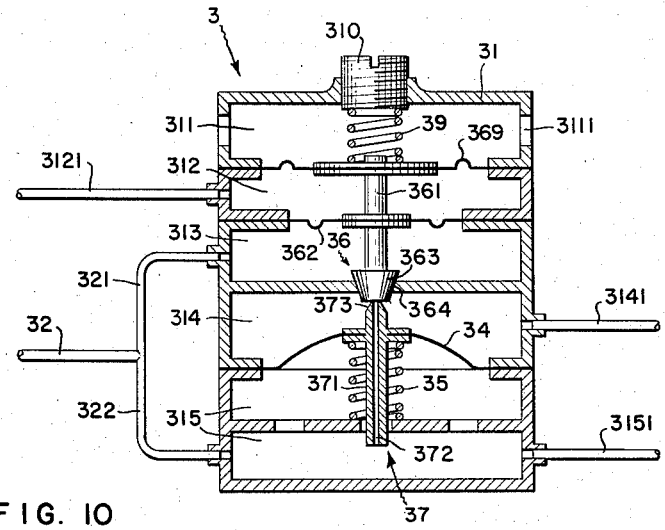
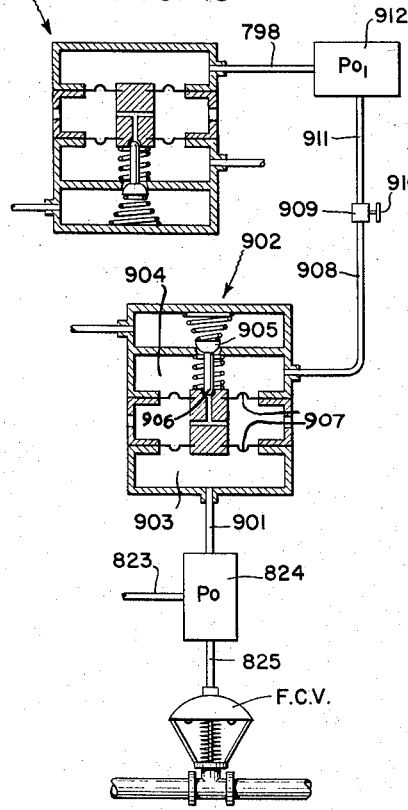
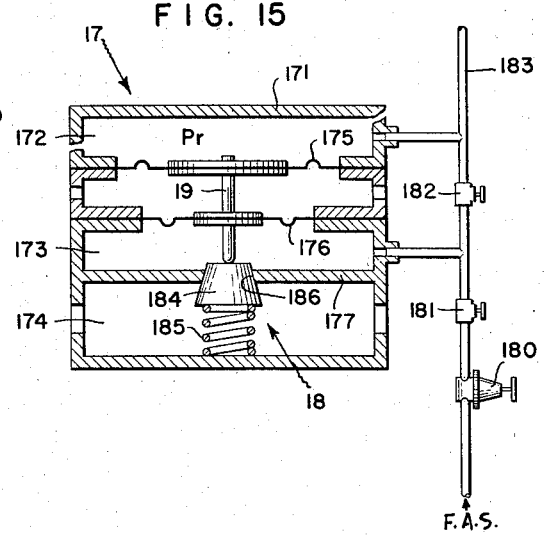
INVENTOR.
EDWARD C. GROGAN
BY
ATTORNEY.

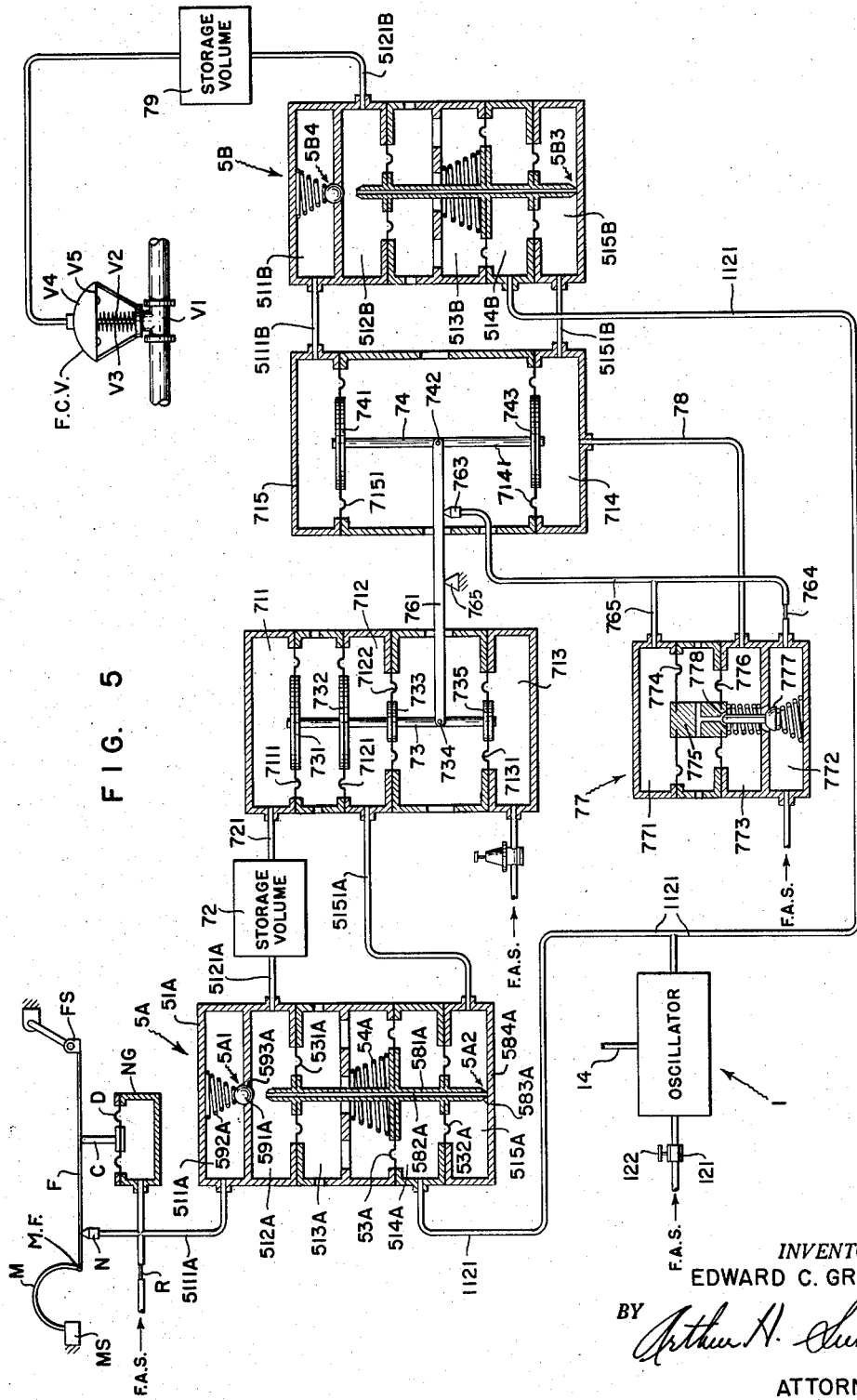

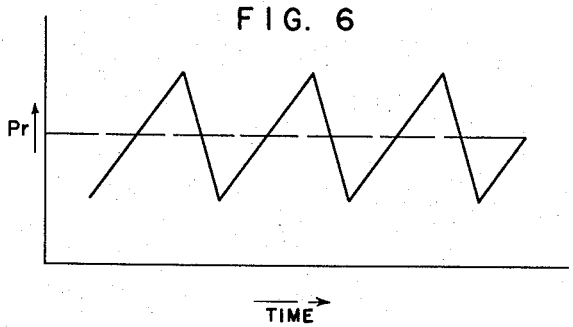
FIG. 6
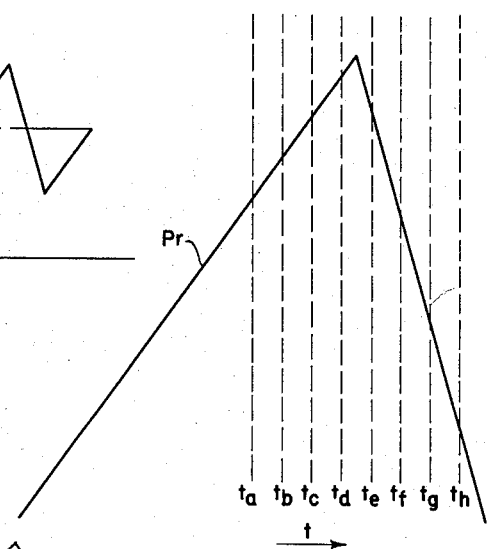
FIG. 7
OVER TIME INTERVAL, $t_a$ TO $t_b$:  FIG. 7A
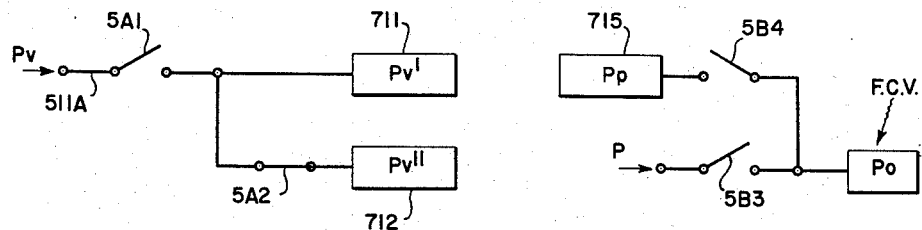
OVER TIME INTERVAL, $t_b$ TO $t_c$:  FIG. 7B
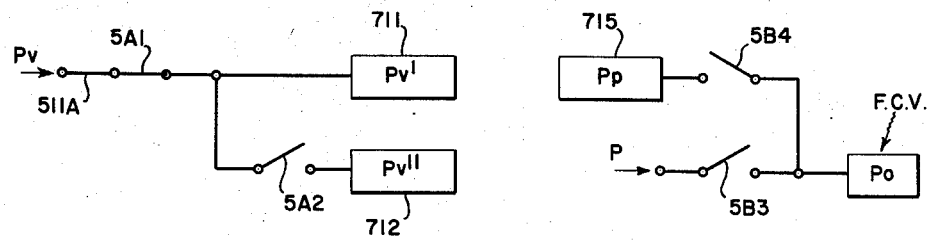
INVENTOR.
EDWARD C. GROGAN
ATTORNEY.

Nov. 24, 1959        E. C. GROGAN        2,914,077
AIR-PRESSURE-ACTUATED, CYCLICALLY OPERATING CONTROLLER
Filed May 11, 1956        11 Sheets-Sheet 5
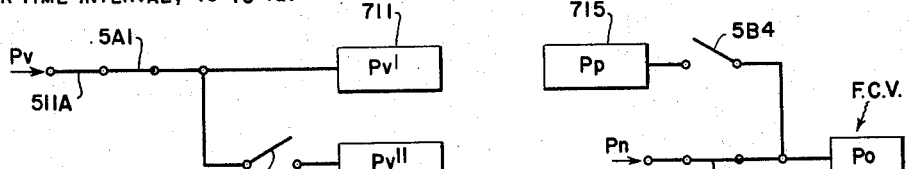
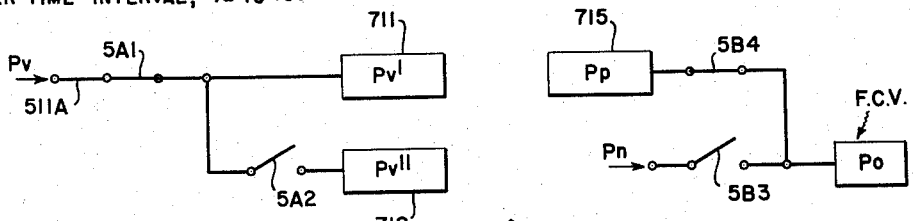
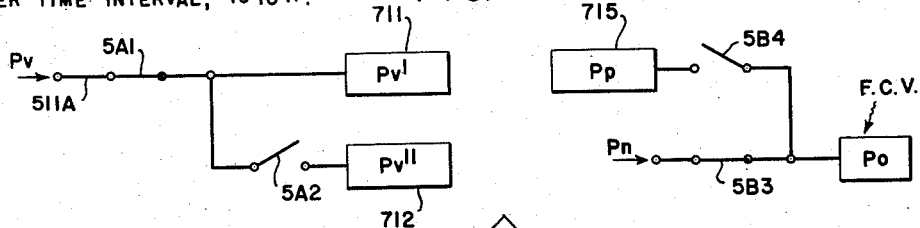
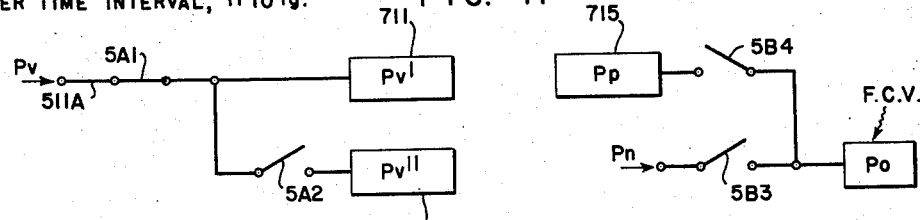
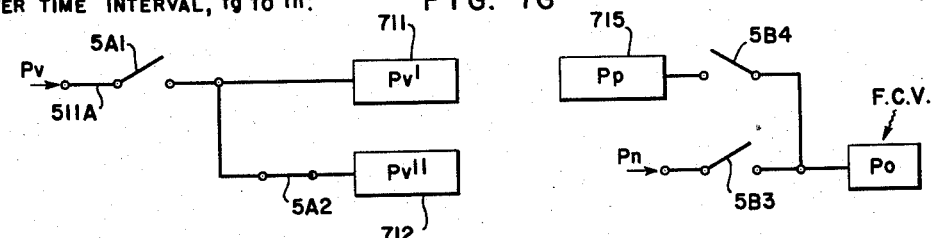
INVENTOR.
EDWARD C. GROGAN
ATTORNEY.

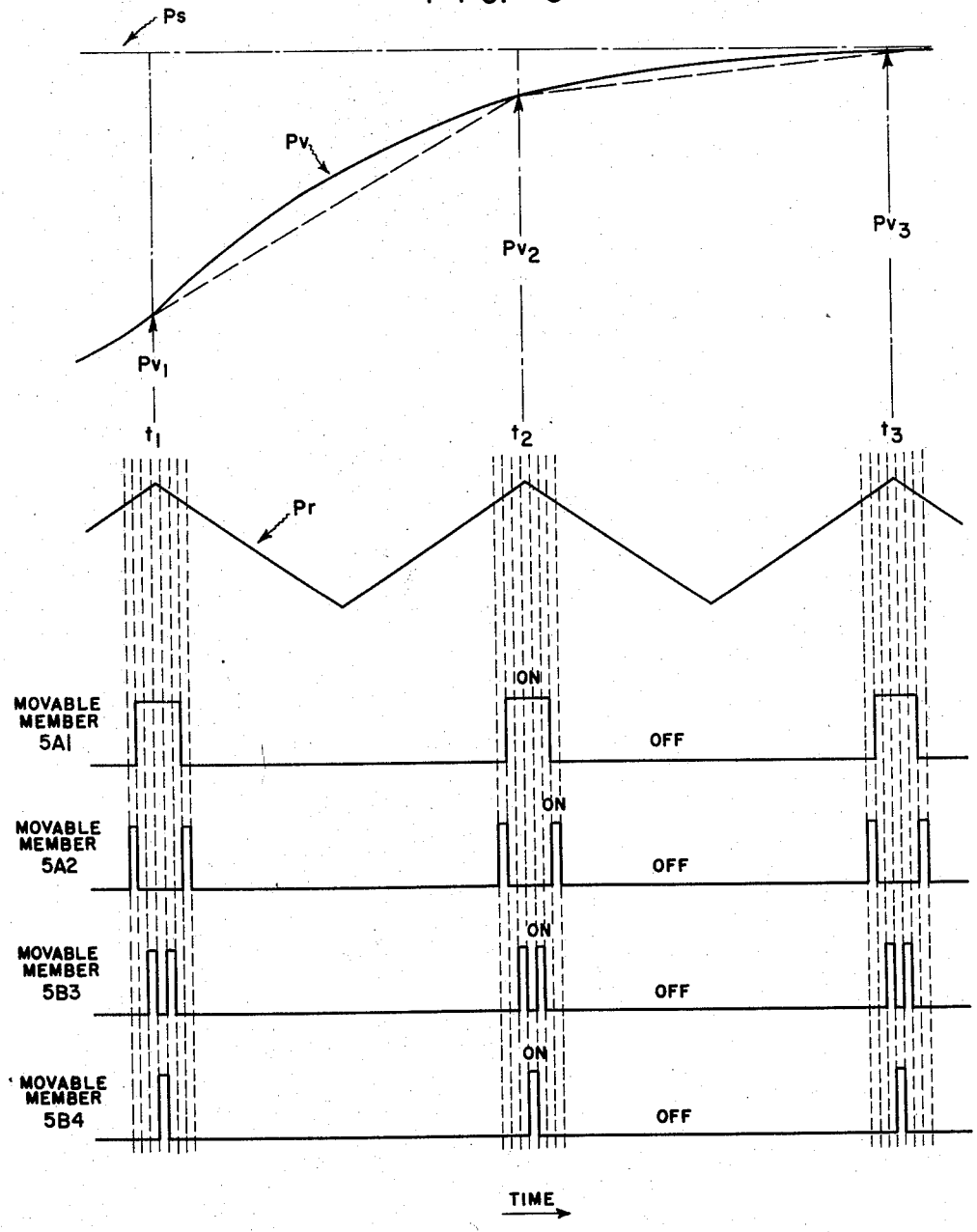

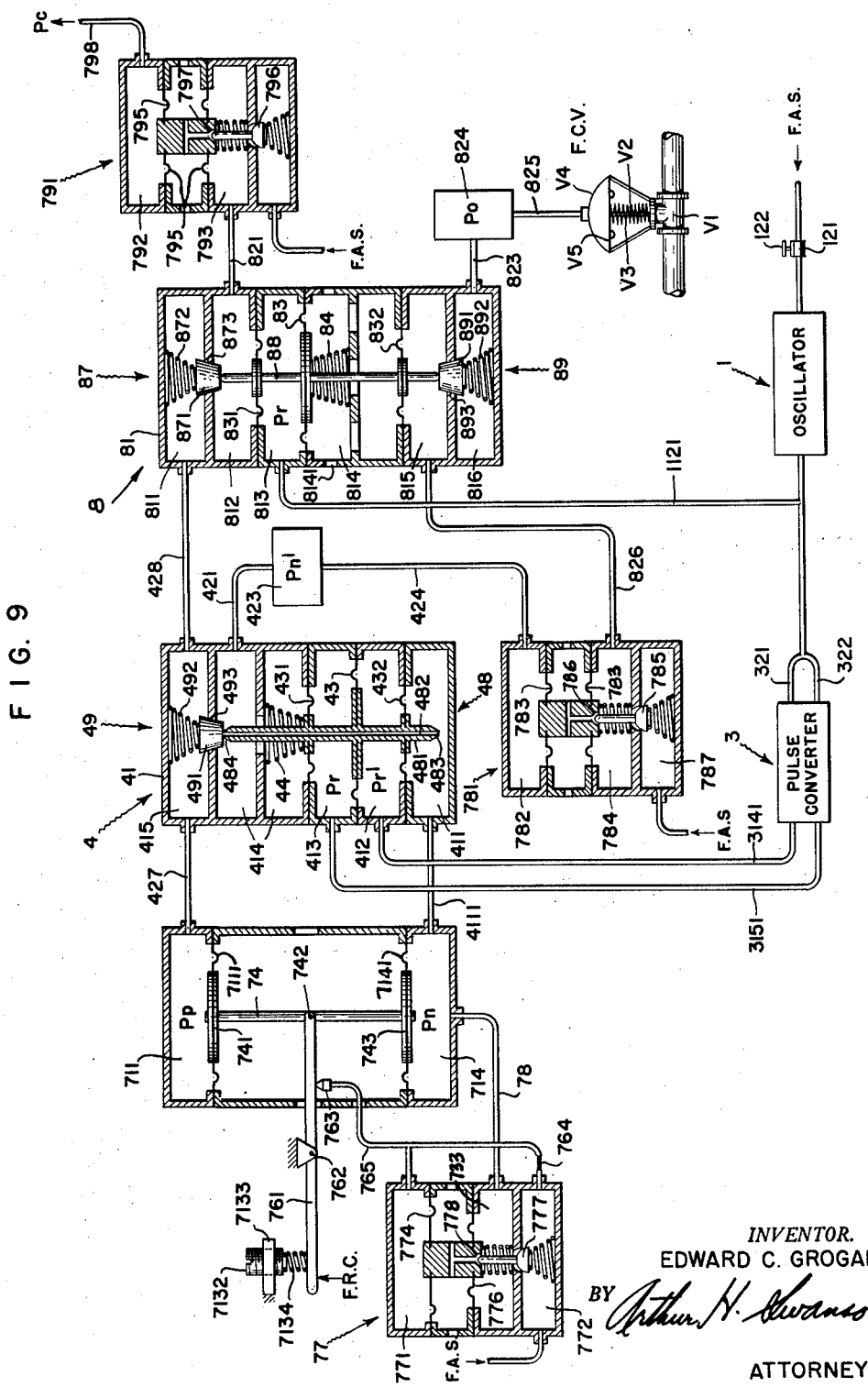

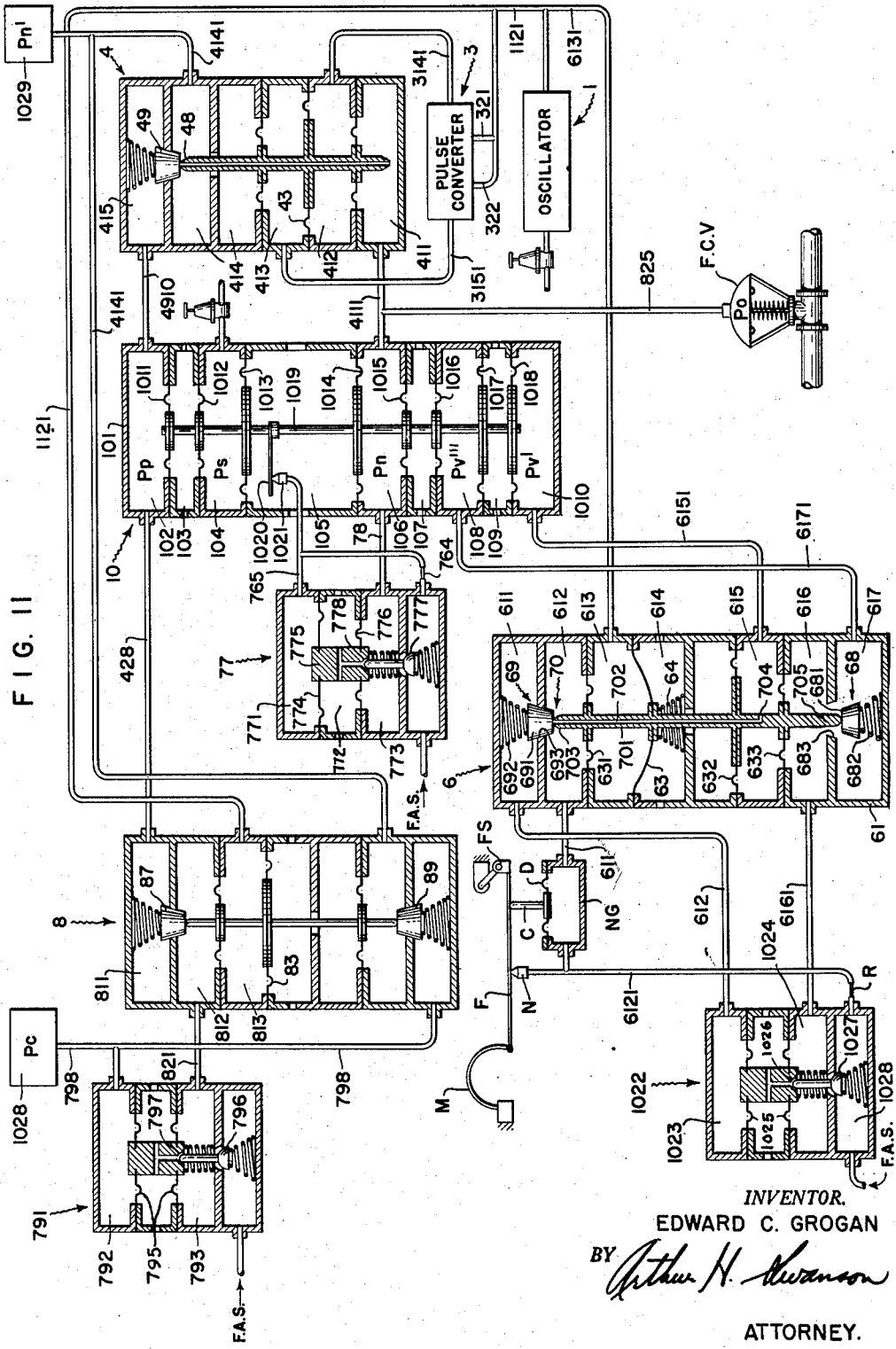

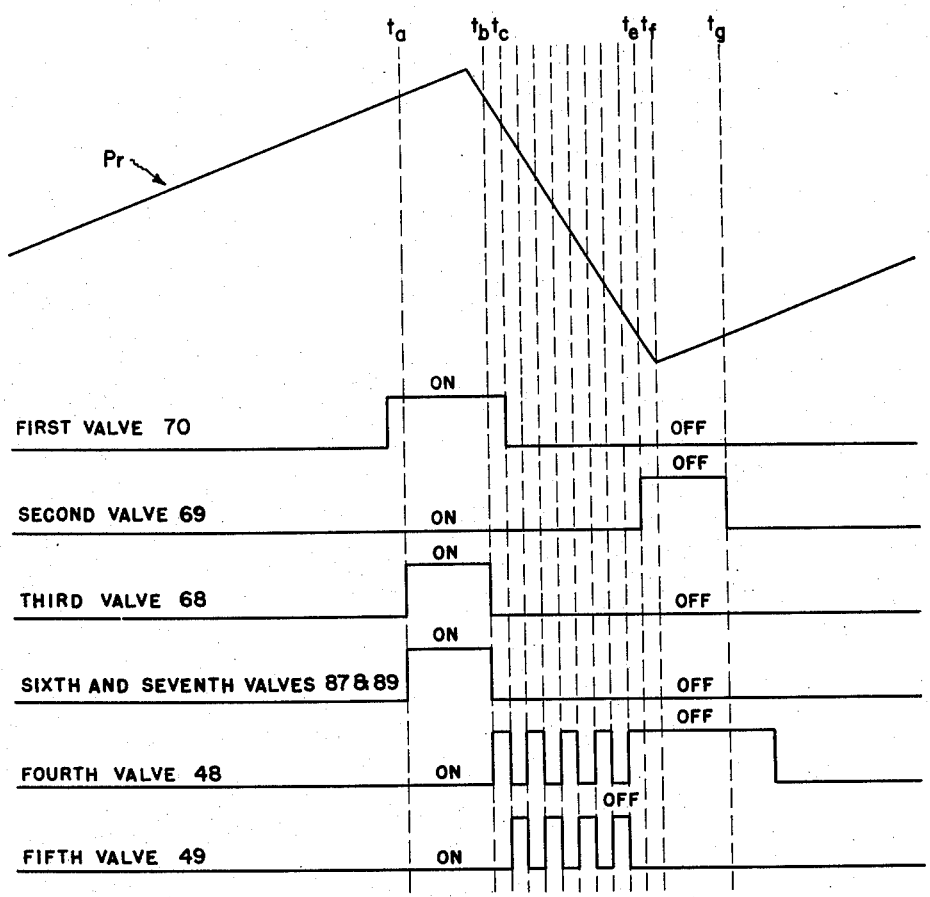

Nov. 24, 1959 E. C. GROGAN 2,914,077
AIR-PRESSURE-ACTUATED, CYCLICALLY OPERATING CONTROLLER
Filed May 11, 1956 11 Sheets-Sheet 10

INVENTOR.
EDWARD C. GROGAN
BY
ATTORNEY.

Nov. 24, 1959  E. C. GROGAN  2,914,077
AIR-PRESSURE-ACTUATED, CYCLICALLY OPERATING CONTROLLER
Filed May 11, 1956  11 Sheets-Sheet 11
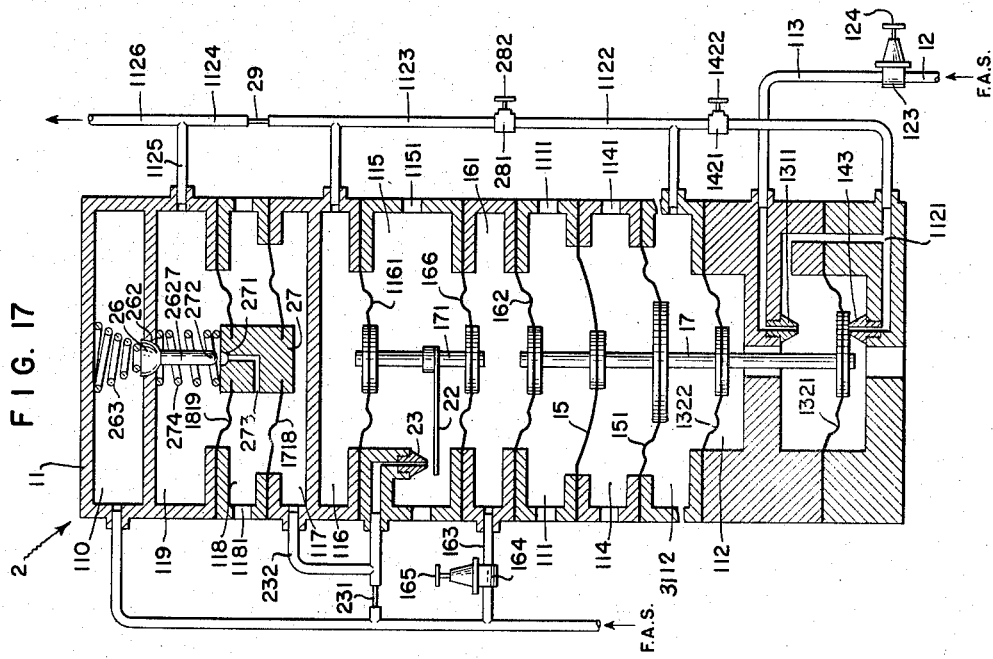
INVENTOR.
EDWARD C. GROGAN
BY
ATTORNEY.

United States Patent Office 2,914,077
Patented Nov. 24, 1959

2,914,077

AIR-PRESSURE-ACTUATED, CYCLICALLY OPERATING CONTROLLER

Edward C. Grogan, Philadelphia, Pa., assignor to Minneapolis-Honeywell Regulator Company, Minneapolis, Minn., a corporation of Delaware Application May 11, 1956, Serial No. 584,302

15 Claims. (Cl. 137—86)

This invention relates to air-pressure-actuated controllers of the force-balance type containing one or more valves, which are opened and closed with great rapidity to vary the resistance to the flow of air through the valves and, consequently, the effective pressure of the air on one side of the valve which thus constitutes, in effect, a resistance.

Air-pressure-actuated controllers of the force-balance type are well known in the art. Such controllers comprise: (1) a measuring element responsive to the instantaneous value of the process variable; (2) a transmitter responsive to said measuring element and adapted to vary the pressure of a supply of air under pressure so that the instantaneous value of the pressure of the air corresponds to the instantaneous value of the process variable; (3) a controller comprising: (3.1) a set-point chamber in which the pressure of a supply of air under pressure is varied manually to represent that value of the process variable which is to act as a datum or base and from which the deviations of the process variable are to be measured; (3.2) a process-variable chamber to which the air under pressure is fed from the transmitter; (3.3) a valve, usually of the flapper-nozzle type, actuated in one direction by the pressure of the air in the process-variable chamber and in the opposite direction by the pressure of the air in the set-point chamber; (3.4) a positive-feedback chamber to which the air is fed from said valve (or from a relay controlled by said valve) and which actuates said valve in the same direction as said valve is actuated by the pressure of the air in the process-variable chamber; and (3.5) a negative-feedback chamber to which air is fed from said valve and which actuates said valve in the same direction as said valve is actuated by the pressure of the air in the set-point chamber.

In the prior art devices with which I am familiar, restrictions (such as small, needle valves) were employed in the various circuits between the chambers mentioned above to delay the flow of air therebetween and to vary the effective pressure of air on one side of a restriction. By suitable combinations of such chambers and such restrictions, those modes of operation of the controller known as reset, rate, proportional-band-adjustment, and ratio could be obtained.

It is an object of this invention to substitute for the restrictions heretofore known, valves which are rapidly opened and closed so as to vary the flow of fluid therethrough and to thereby delay the application of the fluid to the chamber on the off-going side of the valve or to resist the flow of fluid through the valve. The resistance offered by such a valve to the flow of fluid through it may be varied by varying the speed at which the valve is opened and closed, i.e. by varying the time the valve is on compared to the time the valve is off. As used herein, the term "on" means that a valve is in conducting or communicating position so that air can flow through it. The term "off" means that a valve is in non-conducting or non-communicating position so that the flow of air through it is shut off. The use of such rapidly opening and closing valves is referred to herein as a sampling or pulsing technique.

Insofar as I am aware, this is broadly novel. It is known to apply mechanical vibrations or oscillations to valves, usually of the slide valve type, but these oscillations or vibrations are for the purpose of overcoming the static friction or inertia of the valves and do not open and close the valves so as to vary the flow of the air passing therethrough.

An additional object of my invention is to provide a controller which is more compact in size. To produce sufficient rate action, the effective area of the diaphragm or movable element of the process-variable chamber of the controller must be greater than ten to fifteen times that of the movable element of the set-point chamber. In the controller of this invention, however, due to the sampling technique incorporated, the effective areas of the corresponding movable element need only be in the ratio of two to one.

An additional object of this invention is to provide a controller which is less sensitive to "noise." In the prior art controllers, high frequency disturbances in the air pressure or "noise" enter the process-variable chamber but are blocked from entering the rate chamber by the restriction employed. This, together with the continuously acting properties of the controller, causes the input disturbances or "noise" to be amplified. When superimposed on the output (i.e. the control air pressure), this "noise" results in considerable distortion. In the controller of this invention, however, input disturbances or "noise" are prevented from being amplified by (1) the reduced areas of the input diaphragm and (2) the "holding" properties of the circuit or tendency of the circuit to remain in its present condition.

It is a further object of this invention to provide a controller which operates on the principle of sampling. In such a controller, the present state of a system is compared with its previous state, together with the desired set or control point, over discrete intervals of time. The control air pressure is then modified in steps to restore the process variable under control to the desired control or set point. This is done by employing in the input circuit between the transmitter and the process-variable chamber, relays of the simple on-off type (which permit the flow of fluid therethrough only briefly over the sampling interval). Such a sampling controller only requires a simple indication of sampling time. The continuously acting or analog controllers of the prior art employed needle valves or like restrictions of small cross section.

It is a further object of this invention to provide a controller which is easier to adjust than the prior art controllers. In the pulse-type controller of this invention, only two adjustments are required for three mode control; i.e. gain and sampling time. Adjustments of sampling time have the equivalent effect of influencing both the rate and the reset time of the controller; yet, maintaining a fixed ratio between the two.

It is a further object of this invention to provide a controller which may be more readily switched from automatic control to manual control, or vice versa, without "bump."

It is a further object of this invention to provide a controller which offers better control on complex systems. The output-input characteristics of the controller of this invention would interact less intimately with those of the process than would those of the continuously acting controllers of the prior art. The output of the controller of this invention is in the form of pulses which have the effect of "coaxing" the process along. From one sampling interval to the next, the future performance of the system is estimated on the basis of its behavior in the past and the control action is initiated accordingly.

It is a further object of my invention to provide a ratio relay, particularly in a unit of the stacked type. This obviates the need for complex mechanical linkage arrangements, moving pivots, etc., used in the prior art devices.

It is a further object of my invention to provide a controller having improved means of obtaining a proportional band adjustment. Prior adjustable band arrangements employ either impedance divider networks or mechanical linkage systems. The device of the present invention has the advantage of linearity over the prior art controllers.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 1 is a diagram in cross section showing an oscillator;

Fig. 2 is a diagram in cross section showing a modified form of oscillator plus a pressure regulator;

Fig. 3 is a diagram in cross section showing another modified form of oscillator plus an amplifier;

Fig. 4 is a diagram in cross section showing a pulse converter;

Fig. 5 is a pneumatic circuit diagram showing relays applied in the input circuit to the controller;

Fig. 6 is a graph showing the output pressure $P_r$ of an oscillator plotted against time;

Fig. 7 is a graph showing the output pressure $P_r$ plotted against a horizontal scale covering a short period of time;

Figs. 7A–7G are diagrams plotted on the same time scale as Fig. 7 showing parts of the pneumatic circuit shown in Fig. 5 and the positions which these parts assume during the various time intervals indicated;

Fig. 8 is a diagram showing the set point pressure $P_s$, the process variable pressure $P_v$, and the output pressure $P_r$ from the oscillator 1, all plotted against a horizontal scale covering a period of time longer than the period of time shown in Fig. 7 and showing the positions which the movable members 5A1, 5A2, 5B3, and 5B4 assume during the various time intervals indicated;

Fig. 9 is a pneumatic circuit diagram showing the switching relays applied in the feedback circuit between the negative feedback chamber and the positive feedback chamber;

Fig. 10 is a pneumatic circuit diagram showing a connection between the output or final control valve and the positive feedback chamber for the purpose of providing proportional band adjustment;

Fig. 11 is a pneumatic circuit showing a controller having three modes of operation in which the damping relays are employed in the input circuit and in the output circuit and in which the chambers are combined together in a stack;

Fig. 12 is a graph showing the output pressure $P_r$ of an oscillator plotted against time and showing the positions which various movable valve members occupy at the various times indicated;

Fig. 15 is a diagram in cross section showing a modified form of amplifier and the associated air-conducting circuit;

Fig. 16 is a diagram in cross section showing the device of Fig. 1 in its opposite position; and Fig. 17 is a diagram in cross section showing the device of Fig. 3 in its opposite position.

Figure 13:
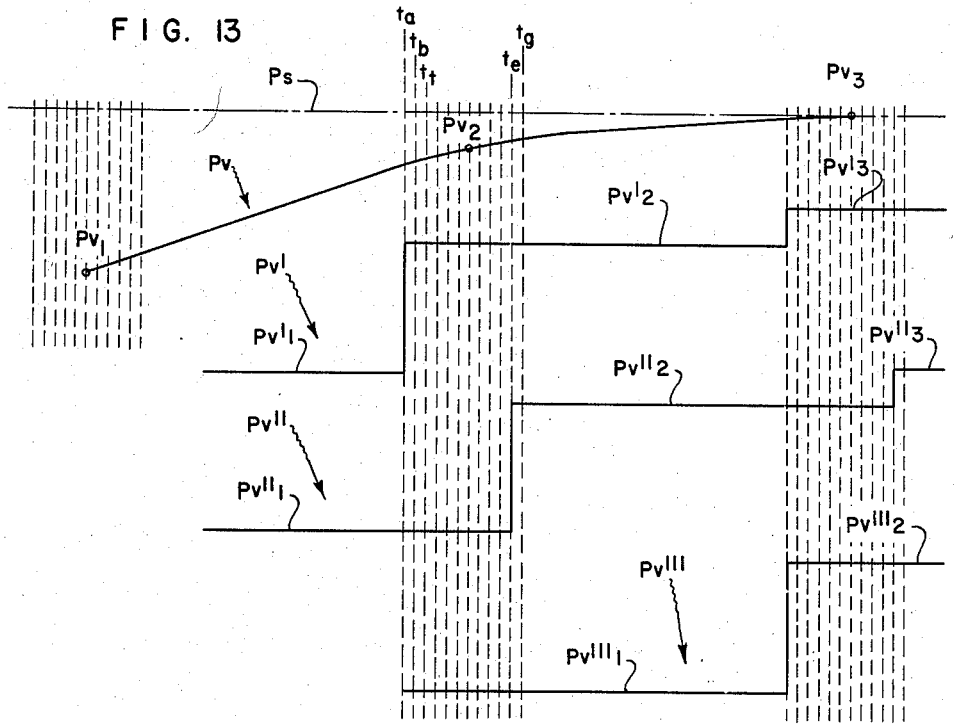
Fig. 13 is a graph of five pressures $P_s$, $P_v$, $P_v'$, $P_v''$, and $P_v'''$, hereinafter referred to, plotted against time.

Fig. 1 shows an oscillator, generally indicated 1, which provides means for varying the pressure of a supply of air in a time cycle including a maximum and a minimum and repeating this cycle. Oscillator 1 comprises a rigid case 11 divided into three chambers 111, 112, and 113 by a movable wall and by a rigid wall.

Inlet chamber 113 is connected to a supply of elastic fluid, such as air under pressure, by means of inlet conduit 12. This supply is indicated as a filtered air supply F.A.S. Inlet conduit 12 contains a manually adjustable restriction in the form of a needle valve or other small valve 121 adjusted by a handle 122.

The rigid wall between chambers 112 and 113 has an opening through it. This opening is controlled by an inlet valve, generally designated 13. Valve 13 comprises valve seat 131 formed by the rim of this opening. Ball valve 132 is pressed by a spring 133 against this valve seat 131.

Chamber 112 contains air at the output pressure which air is led off by means of a conduit 1121.

An exhaust valve, generally indicated at 14, conducts air out of chamber 112. Exhaust valve 14 comprises a hollow tube 141 having a restriction 142 in it and having a lower end 143 adapted to contact and open valve 13.

Oscillatory movement is imparted to inlet valve 13 and exhaust valve 14 by movable element 15, shown as a flexible, metal diaphragm attached at its rim to casing 11 and at its center to exhaust valve tube 141. The force of the pressure of the air in chamber 112 biases diaphragm 15 in one direction. A spring 16 biases diaphragm 15 in the opposite direction.

The operation of oscillator 1 is as follows. When the pressure of the air in chamber 112 is that of the atmosphere, the bias of spring 16 causes diaphragm 15 to be in the opposite position to that in which it is shown in Fig. 1. Fig. 16 shows diaphragm 15, exhaust valve 141, and inlet valve 13 in this position. Diaphragm 15 has a natural bias away from its center or mid-position so that diaphragm 15 imparts a "snap" or "oil-can" action to the exhaust valve 14 attached to it.

When it is desired to start the oscillator 1 into action, the restriction 121 is opened the desired amount by turning handle 122. This admits air under pressure from source F.A.S. to chamber 113. Inlet valve 13 is in on position because ball 132 is held off seat 131 by the lower end 143 of exhaust valve 14. Exhaust valve 14 is therefore in off position because ball 132 closes the lower end 143 of the opening through tube 141. Thus, air enters chambers 113 and 112. When the air in chamber 112 has reached a sufficient pressure, it causes diaphragm 15 to snap from the position, shown in Fig. 1 in which it holds exhaust valve 14 off to the position, shown in Fig. 1, in which the inlet valve 13 is off and the exhaust valve 14 is on. When exhaust valve 14 is off and the exhaust valve 14 is on. When exhaust valve 14 is conducting, it permits air to escape from chamber 112 at a rate controlled by the size of restriction 142. When the force of the pressure of the air in chamber 112 is less than the bias exerted by spring 16 on diaphragm 15, diaphragm 15 snaps from the position in which it is shown in Fig. 1 into the opposite position in which it is shown in Fig. 16. This makes inlet valve 13 on and exhaust valve 14 off. The cycle just recited then repeats itself until restriction 121 is shut or the oscillator 1 is otherwise shut down.

The frequency of the oscillations put out by oscillator 1 is governed by the setting of needle valve or restriction 121 and by the size of the opening in restriction 142. The value or level of the output pressure ($P_r$) in chamber 112 is governed by the force which spring 16 exerts on diaphragm 15. The amplitude or distance from the trough or bottom to the peak or top of one wave is governed by the effective area of diaphragm 15 and the difference between the forces acting on the opposite faces of diaphragm 15 which forces cause the "snap" or "oil-can" action.

Figs. 6 and 7 show the values of the pressure (Pr) put out by oscillator 1 plotted on a vertical axis against time on a horizontal axis. This wave is triangular.

Fig. 2 shows a modified form of oscillator combined with a manually operable air-pressure regulator. This oscillator-regulator is generally designated 20 and comprises a rigid case 201 divided into seven chambers 202–208 by flexible diaphragms 210, 211, and 212 and by rigid walls 213, 214, and 215.

The regulator comprises the upper three chambers including an inlet chamber 204 to which air is admitted from a source F.A.S. through a supply pipe 216. An inlet valve 217 (biased to closed position by a spring 218) governs the communication between inlet chamber 204 and outlet chamber 203. An exhaust valve governs the communication between outlet chamber 203 and exhaust chamber 202. This exhaust valve comprises a plug 220 having an orifice 221 axially therethrough. The upper, rounded end 219 of inlet valve 217 cooperates with the lower end of orifice 221 to form the exhaust valve. A spring 222 bears at one end against a manually adjustable screw 223 and at its lower end against exhaust valve 220.

The bias of spring 222 is balanced by the pressure of the air in outlet chamber 203. If the pressure of the air in chamber 203 drops below the desired pressure, as set by the screw 223, the bias of spring 222 opens inlet valve 218 and admits air from inlet chamber 204. If the pressure of the air in chamber 203 rises above that desired, the pressure of the air in chamber 203 on the lower side of diaphragm 210 overcomes the force of spring 222 and moves exhaust valve 220 away from the upper end 219. This opens the exhaust valve and causes air to escape from chamber 203 through bore 221 to chamber 202 and thence to atmosphere.

The oscillator comprises the lower four chambers. Air at a desired pressure is fed from outlet chamber 203 of the regulator through pipe 228 and manually operable restriction 229 to output chamber 207. From chamber 207 the air passes through pipe 230 and manually operable restriction 231 to pipe 232 and chamber 205. Pipe 233 communicates with pipe 232 and forms the outlet connection for the pressure Pr put out by the oscillator.

Flexible diaphragms 211 and 212 are mounted at their rims in the case 201 and are connected at their centers by a rod 224. An exhaust valve governs the communication between chamber 207 and outlet chamber 208, which is vented to atmosphere. This exhaust valve comprises a plug 226 biased by a spring 227 into engagement with a stationary valve seat 225 formed by the rim of an orifice in rigid wall 215.

The operation of the oscillator disclosed in Fig. 2 is as follows. Air at a desired pressure is fed from the regulator through pipe 228 and restriction 229 to chamber 207. Since valve 226 is off, this air under pressure is fed through pipe 230, restriction 231, and pipe 232 to chamber 205. Diaphragm 211 has a larger active surface than diaphragm 212. The volume or capacity of chamber 205 is much larger than that of chamber 207. Therefore, when the pressure of the air in 207 has a ratio to the pressure of the air in 205, which ratio is less than has been preselected in the design of the apparatus, diaphragms 211 and 212 move rod 224 downward and thereby move valve 226 on because of the pressure build up in chamber 205. This dumps the air from chamber 207 to the atmosphere through chamber 208. The pressure of the air in chamber 205 forces air back through pipe 232, restriction 231, pipe 230, chamber 207 and valve 226 to atmosphere. This flow of air takes place at a greater rate than the supply of fresh air through restriction 229. Therefore, the pressure of the air in chamber 207 does not build up as rapidly as the pressure of the air in 205 decreases. When the pressure of the air in chamber 207 aided by the bias of spring 227 becomes greater than the pressure of the air in 205 in the preselected ratio, diaphragms 211 and 212 move rod 224 in the opposite direction. This moves valve 226 off. Since the air can no longer escape from chamber 207 through valve 226, the pressure of the air in chamber 205 builds up until the pressure of the air in chamber 207 is again less than the pressure of the air in chamber 205 in the preselected ratio. At this time the cycle again repeats itself. Thus, the pressure Pr, when plotted on a vertical axis against time on a horizontal axis, appears as a triangular wave.

Figs. 3 and 17 show a modified form of oscillator combined with an amplifier. The oscillator comprises an inlet conduit 12 connected to a source F.A.S. of fluid under pressure. An air-pressure regulator 123 may be manually adjusted by handle 124 so as to vary the pressure in inlet chamber 113 formed by the interior of a pipe leading from the off-going side of air pressure regulator 123 to valve seat 1311 and by the bore through valve seat 1311. An inlet valve governs the flow of air from inlet chamber 113 to output chamber 112. This inlet valve comprises a valve seat 1311 adapted to cooperate with the upper face of movable valve member 1321. An exhaust valve governs the escape of air from chamber 112. This exhaust valve comprises a valve seat 143 which cooperates with the lower face of movable valve member 1321.

A conduit 1121 leads air from output chamber 112 to a restriction 1421 which is manually adjusted by a handle 1422. The off-going side of restriction 1421 is connected by a conduit 1122 to a biasing chamber 3112 in case 11. A flexible diaphragm 151 is attached at its rim to case 11 and at its center to rod 17 and forms a movable wall of biasing chamber 3112. Flexible diaphragm 15 is located between chamber 111, which is open to the atmosphere through vent 1111, and chamber 114, which is open to the atmosphere through vent 1141.

Rod 17 is located axially of case 11 and is connected to diaphragm 162, to diaphragm 15, to diaphragm 151, and to sealing diaphragms 1322 and 1321. Bias is applied to rod 17 and to the parts connected thereto, by means of the pressure in chamber 161. The pressure in chamber 161 may be adjusted by means of an air-pressure regulator 164 connected to a supply F.A.S. of fluid under pressure and controlled by a manually adjustable handle 165 to vary the pressure transmitted from the pressure regulator 164, which may be located at a distance, through the conduit 163 to chamber 161.

The operation of the oscillator shown in Fig. 3 is as follows. When the device is at rest and the pressure of the air in all the chambers is that of the atmosphere, the diaphragm 15 may occupy the position in which it is shown in Fig. 3 or may occupy the opposite position. If it is now desired to start the oscillator, restriction 164 is made conducting by turning handle 165 so that air is admitted to chamber 161. The pressure of the air in chamber 161 acts on movable diaphragm 162 and rod 17 to cause diaphragm 15 to snap from the position in which it is shown in Fig. 3 to the opposite position. Air is admitted to inlet chamber 113 from source F.A.S. by making regulator 123 conducting by turning handle 124. Since the inlet valve is on because sealing diaphragm 1321 is moved away from valve seat 1311, the air escapes from inlet chamber 113 to outlet chamber 112. Air cannot escape from outlet chamber 112 because the exhaust valve is off because sealing diaphragm 1321 is closed against valve seat 143. Therefore, conduit 1121 conducts the air from chamber 112 through restriction 1421 and conduit 1122 to chamber 3112. The pressure of the air in chamber 3112 acts on flexible diaphragm 151 so as to move rod 17 and thereby move diaphragm 15 and diaphragm 162 against the pressure of the air in chamber 161. Diaphragm 15 operates with a snap action whenever the pressure in chamber 3112 becomes greater or less than the pressure of the air in chamber 161.

Fig. 3 also shows an amplifier located in the case 11 together with the oscillator. This amplifier comprises five chambers 115, 116, 117, 118, 119, and 110.

A flapper 22 is located in chamber 115 and is mounted on a rod 171 connected to two diaphragms 166 and 1161. Chamber 115 is vented to atmosphere through port 1151.

With flapper 22 cooperates a nozzle 23 to which air is fed through a restriction 231 and which communicates with chamber 117 through conduit 232.

Air is fed from a source F.A.S. of air under pressure to chamber 110. Air is admitted from input chamber 110 to output chamber 119 by an inlet valve comprising a seat 262 and a movable valve member 26 cooperating therewith. Inlet valve 26—262 is biased to off by spring 263. Air is exhausted from output chamber 119 by means of exhaust valve 27 which includes a movable valve member 271 connected to inlet valve 26 by a stem 2627. Exhaust valve 27 includes a block mounted on diaphragms 1819 and 1718 and having a port 273 through it which cooperates at one end as a valve seat 272 with movable valve member 271. At its off-going end, conduit 273 communicates with chamber 118 which is vented to atmosphere through ports 1181. Spring 274 biases exhaust valve 27 to on because it stresses valve seat 272 away from movable valve member 271.

The operation of amplifier 2 is as follows. The pressure of the air in chamber 161 is varied by manually adjusting handle 165 so as to vary the pressure of the air put out by regulator 164. The pressure of the air in chamber 161 biases diaphragm 166 and tends to move flapper 22 toward nozzle 23. The pressure of air in chamber 117 is governed by the flapper 22 and the nozzle 23. The pressure of the air in chamber 117 is applied by diaphragm 1718 so as to bias exhaust valve to off and inlet valve 26—262 to on. The pressure of the air in chamber 119 opposes the pressure of the air in chamber 117. When the pressures in these chambers are at some selected ratio, both inlet valve 26 and exhaust valve 27 will be off. The air put out by the oscillator is fed through pipe 1122 to the on-coming side of a restriction 281 which is manually adjustable by handle 282. The air on the off-going side of restriction 281 is fed by conduit 1123 to chamber 116. The pressure of the air in chamber 116 operates on diaphragm 1161 against the pressure of the air in chamber 161 to give negative feedback action to the flapper 22. The air in conduit 1123 is also fed to one side of a fixed restriction 29 which is connected at its opposite side to conduit 1124 which branches and connects, by means of conduit 1125 to chamber 19 and, by means of conduit 1126, to the output of the oscillator and amplifier.

Restriction 1421 governs the flow of air to biasing chamber 3112 and thereby governs the frequency of the oscillator. Regulator 164 governs the pressure of the air in the chamber 161 and thereby governs the level or pressure of the air at which the oscillator operates. The pressure of the air in chamber 116 also forms one input to amplifier 2. Restriction 281 governs the flow of air from the oscillator to the negative feedback chamber 116 of the amplifier and thereby governs the amplitude of the oscillations put out by the amplifier. The fixed restriction 29 governs the amount of the total output of the oscillator which is bled off directly to the output of the oscillator and amplifier and the amount which is fed to the negative feedback chamber 116 of the amplifier.

Fig. 4 shows a pulse converter, generally indicated at 3, and comprising a rigid case 31 divided into five chambers 311, 312, 313, 314, and 315 by one rigid wall and by two flexible walls. An inlet conduit 32 communicates, by branch 321, with inlet chamber 313 and, by branch 322, with inlet chamber 315.

A valve, generally indicated at 36, governs the communication between chambers 313 and 314. A valve, generally indicated at 37, governs the communication between chambers 315 and 314.

Valve 36 comprises a valve stem 361 which cooperates at its lower end 363 with a valve seat 364 comprising a central hole in the rigid wall which separates chambers 313 and 314. Valve 37 comprises a valve stem 371 having an orifice 372 axially thereof. The upper end 373 of orifice 372 cooperates with the lower end 363 of valve stem 361 to close communication between chambers 315 and 314 when valve 37 is off. Valve stem 361 is mounted on actuating diaphragm 369 and sealing diaphragm 362.

A spring 39 bears at one end on an adjustable screw 310 screw-threadly mounted in case 31 and, at its opposite end, on diaphragm 369. Spring 39 thus biases valve 36 to off because spring 39 causes valve stem 361 to engage valve seat 364.

If desired, valve 36 may be actuated from a remote position. This is done by means of chamber 312 to which air under pressure is led from a manually adjustable valve (not shown) through inlet conduit 3121. The force of the pressure of the air in chamber 312 opposes the bias of spring 39 so that, when the pressure of the air in chamber 312 is varied in relation to the pressure of spring 39, valve 36 is moved by regulating the pressure of the air in chamber 312.

Valve stem 371 is mounted on flexible diaphragm 34 which is held at its rim in case 31. Spring 35 biases diaphragm 34 and valve 37 to off. The force of the pressure of the air in outlet chamber 314 opposes the pressure of spring 35 so that, when the force of the pressure of the air in chamber 314 is greater than the force of spring 35 and the force of the pressure of the air in chamber 315, valve 37 is moved to on in which end 373 is disengaged from the tip 363 of valve 36. Thus, communication is open between chambers 315 and 314 through orifice 372. Outlet conduit 3141 conducts off the air from chamber 314 and outlet conduit 3151 conducts off the air from chamber 315.

Fig. 5 is a pneumatic circuit diagram showing an air-pressure-operated, force-balance-type controller having three mode control, i.e. proportional plus reset plus rate response. This controller employs the sampling or pulse type of actuation so that only two adjustments are required for three mode control, i.e. gain and sampling time. Adjustments of sampling time have the equivalent effect of influencing both the rate and the reset time of the controller; yet, maintaining a fixed ratio between the two.

Sampling or pulse type of actuation, as used herein, means that an air pressure $Pv$ proportional to the instantaneous value of the process variable is applied to the controller for short, sampling periods of time which sampling periods are repeated at intervals of time sufficiently short that the process variable does not vary so greatly during the time intervals as to render the measurements taken during the sampling time intervals so few as to be not representative of the variations in the process variable.

In the controller illustrated in Fig. 5, the process variable pressure $Pv$ is applied to the controller for a short, sampling period of time. This value is then stored in the controller for a short time interval during which the process variable pressure is not applied to the controller. The process variable pressure is then applied to the controller for a second, short, sampling period of time. This second value is then also stored in the controller for a short time interval during which the process variable is not applied to the controller. After this second time interval, the process variable pressure is applied to the controller for a third, short, sampling period of time. During this third period, the process variable pressure is compared with the values thereof stored in the controller during the first and second sampling periods and with constant bias or set point value applied to the controller. If the algebraic sum of these four values does not cause the controller to balance, the change in air pressure due to the resulting movement of the controller is referred to herein as the error signal. This error signal is applied to the negative feedback chamber and to the positive feedback chamber of the controller in such a way as to cause the output pressure of the controller to stabilize at a value representing the average or mean value of the process variable during the time interval between the second and third sampling periods. The requirements of present day air-pressure-operated transmitters, controllers and final control elements are such that the time interval referred to above should be of the order of one second. The sampling period must be a much shorter time.

The process variable which actuates the controller is sensed by a measuring element M. Measuring element M is shown as a Bourdon tube but may be any type of measuring element adapted to respond to the instantaneous value of a process variable. Measuring element M has a fixed end MS and a free or movable end MF pivotally connected to the free or movable end of a flapper F having a fixed pivot FS.

Flapper F cooperates with a nozzle N which is connected to: (1) a supply F.A.S. of air under pressure by a restriction R; (2) a negative feedback chamber NG having a movable wall D connected by a link C to the flapper F; and (3) an input conduit 5111A. The pressure of the air in nozzle N, as controlled by flapper F, is the process variable pressure Pv. Input conduit 5111A leads to a sampling or switching relay 5A.

Fig. 5 shows a pair of these sampling or switching relays, one of which will be described now. This relay is generally designated 5A and comprises a rigid case 51A divided into five chambers 511A, 512A, 513A, 514A, and 515A by one rigid wall and by three flexible walls. A valve, generally designated 5A2, governs the communications between chambers 515A and 512A and is normally off. A valve, generally designated 5A1, governs communication between chambers 511A and 512A and is also normally off.

Valve 5A2 includes a valve stem 581A having a bore 582A axially through it. The lower end 583A of bore 582A is normally closed by engagement with the inner wall 584A of chamber 515A.

Valve stem 581A is mounted on actuating diaphragm 53A and on sealing diaphragms 531A and 532A. Spring 54A biases valve 58A towards off.

Valve 5A1 includes a ball 591A biased by spring 592A toward engagement with valve seat 593A comprising the rim of a central orifice through the rigid wall which separates the chambers 511A and 512A.

The operation of relay 5A is as follows. Air at a cyclically varying air pressure is conducted from oscillator 1 or pulse converter 3 through inlet conduit 1121 to chamber 514A. If the force of the pressure of the air in chamber 514A is strong enough to overcome the pressure of spring 54A, valve 5A2 is made conducting because valve stem 581A is lifted until the lower end 583A of bore 582A is disengaged from the inner wall 584A of chamber 515A.

If the pressure of the air in chamber 514A increases so that the force of the pressure is sufficient to overcome the force of spring 54A and the force of spring 592A also, valve 5A1 is made conducting because valve stem 581A engages ball 591A and lifts ball 591A off its seat 593A. This opens communication between chambers 511A and 512A. At the same time, communication between chambers 512A and 515A is closed because the upper end of bore 582A engages with ball 591A and closes bore 582A.

Relay 5B is a duplicate of relay 5A. It is made up of like parts marked with the same reference characters with B substituted for A, with the following exception. The duplicate of movable element or valve 5A1 is marked 5B4. The duplicate of movable element or valve 5A2 is marked 5B3.

The pressure in chamber 514A and also in chamber 514B is varied by the osciliator 1. Oscillator 1 is disclosed in detail in Fig. 1. Oscillator 1 has a connection to supply F.A.S., which connection is controlled by a needle valve 121, an exhaust valve 14, and an outlet connection 1121.

In Fig. 5, the controller proper comprises five chambers 711, 712, 713, 714, and 715, each of which has one or more flexible walls 7111, 7121, 7122, 7131, 7141, and 7151. Movable walls 7111, 7121, 7122, and 7131 are connected at 731, 732, 733, and 735, respectively, to rod 73. Movable wall 7141 is connected at 743 and movable wall 7151 is connected at 741 to a second rod 74. Rod 73 has pivotal connection at 734 and rod 74 has pivotal connection at 742 with the opposite ends of a flapper rod 761 mounted on a normally stationary pivot 762, which may be adjusted lengthwise of rod 761 to provide proportional band adjustment.

Flapper 761 cooperates with a stationary nozzle 763 connected through restriction 764 with a supply F.A.S. of air under pressure. A conduit 765 connects nozzle 763 with a pilot valve or relay, generally indicated at 77.

Pilot valve or relay 77 is of a well-known commercial construction. As shown in Fig. 5, relay 77 comprises a rigid case divided into three chambers 771, 772, and 773. Chamber 771 has a rigid wall and a flexible diaphragm 774. Chamber 773 has a rigid wall and a flexible diaphragm 776. Chamber 772 has rigid walls. A rod 775 connects the centers of flexible diaphragms 774 and 776 together. An inlet valve 777 is operable to admit air from a source of air F.A.S. and inlet chamber 772 to chamber 773. An exhaust valve 778 is operable to exhaust air from chamber 773 to atmosphere. Valves 777 and 778 are interlocked so that only one is open at a time. The controlled air pressure in chamber 773 is connected by an output conduit 78 to negative feedback chamber 714 and to inlet chamber 515B of sampling or switching relay 5B.

Chamber 515B which is the input side of movable element 5B3 is connected by conduit 5151B to the positive feedback chamber 714 and by output conduit 78 to the controlled air pressure chamber 773 of the relay 77. The chamber 511B which is the off-going side of movable element 5B4 is connected by conduit 5111B to the negative feedback chamber 715. Chamber 512B is connected by conduit 5121B to a hollow chamber 79 and thence to the final control element FCV.

The final control element FCV is illustrated as a valve and comprises a valve body V1 having a valve stem V2 which bears, at one end, the plug or movable valve element and which is connected, at the other end, to movable element V5 of the motor having a rigid casing V4. Valve stem V2 is adapted to be moved agianst the stress of spring V3 by the pressure of the air in the valve motor V4—V5.

The operation of the controller shown in Fig. 5 is best explained by reference to Figs. 5, 7, 8, and 9.

As was explained in connection with Figs. 1 and 7, oscillator 1 puts out an output pressure Pr which, when plotted on a vertical axis against time on a horizontal axis, varies as a triangular wave.

Figs. 7 and 7A—7G show how the movable members 5A1 and 5A2 of relay 5A and the movable members 5B3 and 5B4 of relay 5B, which are normally off, operate as the output pressure Pr from oscillator 1 nears a peak and falls away again.

Fig. 7 shows a plot of the output pressure Pr near its peak and a plurality of vertical lines representing short horizontal intervals of time $t_a$ to $t_n$.

Fig. 7A shows that, as the output pressure Pr increases over the time interval $t_a$ to $t_b$, movable member 5A2 is on between chambers 711 and 712. By reference to Fig. 5, it is seen that this action occurs when the pressure of the air in chamber 514A is sufficient to cause diaphragm 53A to lift the lower end of bore 582A away from wall 584A and thus connect chambers 512A and 515A. Until the upper end 593A of stem 581A engages ball 591A, movable member 5A1 (represented by ball 591A) remains on its seat. Therefore, communication between chambers 511A and 512A remains closed, i.e., movable member 5A1 is off. Fig. 7A also shows that pressure Pr which is sufficient to close movable member 5A2 is insufficient to make movable member 5B3 or 5B4 conducting.

Fig. 7B shows that an increase of pressure Pr over the time interval $t_b$ to $t_c$ moves movable member 5A2 to off and simultaneously moves member 5A1 to open communication between inlet conduit 511A and chamber 711. During this time interval movable members 5B3 and 5B4 still remain off.

Fig. 7C shows that, over the time interval $t_c$ to $t_d$, the pressure Pr is sufficient to maintain movable member 5A1 on but to keep 5A2 off. However, pressure Pr has now risen sufficiently to cause movable member 5B3 to conduct while movable member 5B4 remains non-conducting.

Fig. 7D shows that the pressure Pr over the time interval $t_d$ to $t_e$, is sufficient to maintain movable member 5A1 conducting, 5A2 non-conducting, to make movable member 5B3 non-conducting, and to make member 5B4 conducting.

Fig. 7E shows that, over the time interval $t_e$ to $t_f$, the pressure Pr is sufficient to maintain movable member 5A1 conducting, 5A2 non-conducting, to make movable member 5B3 conducting, and to make movable member 5B4 non-conducting.

Fig. 7F shows that, over the time interval $t_f$ to $t_g$, the pressure Pr is sufficient to maintain movable member 5A1 conducting, to maintain movable member 5A2 non-conducting, and to make movable members 5D3 and 5D4 non-conducting.

Fig. 7G shows that, over the time interval $t_g$ to $t_h$, the pressure Pr has fallen sufficiently to allow movable member 5A1 to become non-conducting, to allow movable member 5A2 to become conducting, and to maintain movable members 5B3 and 5B4 non-conducting.

As the pressure Pr continues to decrease, all the movable members 5A1, 5A2, 5B3, and 5B4 become and remain non-conducting until the next sampling cycle.

Fig. 8 is a diagram showing set point pressure Ps, which is manually adjusted in the chamber 713; process variable pressure Pv, which is adjusted in the chamber 511A of the relay 5A by the measuring element M and the transmitter; and the output pressure Pr of oscillator 1 plotted on vertical axes against time on a horizontal axis. Fig. 8 also shows the positions of the movable members 5A1, 5A2, 5B3, and 5B4, respectively, at the same time as the pressures shown above. In other words, the pressure Pr and the positions of the movable members are plotted to the same horizontal time axis in Fig. 8. It will be noted that the net stampling period ($t_a$ to $t_h$) is much less than the interval between each sampling period and the next succeeding sampling period.

Fig. 9 shows an air-pressure-actuated device in which the input has a pre-selected ratio or relation to the output. This ratio may be adjusted manually. In the device shown, the input is a force, designated by the arrow F.R.C. and the output is an air pressure Po.

The input force F.R.C. is applied to one end of a flapper rod 761 which is pivoted on a pivot 762, which may be adjusted manually lengthwise of rod 761 to vary the proportional band.

A zero adjustment comprises a spring 7134 which bears, at one end, against one end of rod 761, and, at the other end, against the lower face of a screw 7132 which is mounted in a stationary block 7133.

Rod 761 cooperates as a flapper with a stationary nozzle 763 which is connected to a source F.A.S. of air under pressure through a restriction 764 and inlet chamber 772 and, by means of a conduit 765, with chamber 771 of amplifying relay 77. Relay 77 is of the amplifying type, i.e. the input pressure is less than the output pressure.

The output pressure Pn from relay 77 is fed through conduit 78 to the negative feedback chamber 714 having a movable wall or diaphragm 7141 connected at 743 to rod 74.

Negative feedback pressure Pn is also fed through conduit 4111 to form one input to a switching or sampling relay 4.

Relay 4 comprises a rigid case 41 divided into five chambers 411, 412, 413, 414, and 415 by one rigid wall and three flexible walls. A valve, generally indicated 48, controls the communication between chambers 411 and 414. Valve 48 comprises a valve stem 481 having a bore 482 axially through it. Valve stem 481 is mounted in case 41 by actuating diaphragm 43 and by sealing diaphragms 431 and 432. The lower end 483 of valve stem 481 is in open communication with chamber 411. The upper end 484 of bore 482 can close communication between chambers 411 and 414 by engaging the lower face of valve plug 491.

A second valve, generally designated 49, controls the communication between chambers 414 and 415. Valve 49 comprises a movable valve plug 491 which is biased by spring 492 into engagement with a stationary valve seat 493 formed by the rim of an opening in the rigid wall which divides chambers 414 and 415.

The pressure in chamber 414 is designated Pn' and is conducted by conduit 421 to a hollow chamber 423 which communicates by a conduit 424 with the inlet chamber 782 of a one-to-one relay, generally designated 781. The volume or capacity of chamber 423 is equal to that of the positive feedback chamber 711.

Relay 781 has its control chamber 782 divided by a pair of flexible diaphragms or movable walls 783 from and output chamber 784. An inlet valve 785 admits air from a source F.A.S. of air under pressure and inlet chamber 787, to chamber 784. A valve 786 exhausts air from chamber 784 to atmosphere. Valves 785 and 786 are actuated by diaphragm 783 and are so interlocked that only one of the valves can be opened at a time.

The output chamber 784 is connected to input chamber 815 by a conduit 826.

A second sampling or switching relay, generally designated 8, comprises a rigid case 81 divided into six separate chambers 811, 812, 813, 814, 815, and 816 by two rigid walls and three flexible walls.

A third valve, generally designated 89, controls the communication between chambers 815 and 816. Valve 89 comprises a valve plug 891 biased by a spring 892 into engagement with a stationary valve seat 893 formed by the rim of an opening in the rigid wall which divides chambers 815 and 816.

A fourth valve, generally designated 87, comprises a valve plug 871 biased by a spring 872 into engagement with a stationary valve seat 873 formed by the rim of an opening in the rigid wall which separates chambers 811 and 812.

A valve actuator comprises a rod 88 mounted in case 81 by actuating diaphragm 83 and smaller, sealing diaphragms 831 and 832. Rod 88 bears at its ends against valve plugs 891 and 871. Actuator 88 and the parts connected thereto are biased by spring 84 located in chamber 814 which is vented to atmosphere through orifices 8141.

Relay 8 puts out an output pressure Po. Pressure Po is led from chamber 816 through pipe 823 to hollow chamber 824 and thence through pipe 825 to the final control element FCV.

This final control element FCV comprises a valve V1 having a valve stem V2 which bears at one end the plug or actuating member of the valve and is connected at its other end to the diaphragm V5. A spring V3 bears at one end on the rigid case of valve V1 and at its other end against the lower face of diaphragm V5. A rigid wall V4 defines a chamber connected to a conduit and of which diaphragm V5 forms a movable wall.

A manually adjustable reference pressure Pc is fed to relay 8 through a one-to-one relay 791.

Relay 791 comprises a control chamber 792 and an output chamber 793 in which is located an inlet valve 796 and an exhaust valve 797. A movable wall, such as flexible diaphragms 795 of equal size, separates chambers 792 and 793. Diaphragms 795 actuate valves 796 and 797, which are so interlocked that only one of these valves can be opened at a time.

A conduit 821 connects the output chamber 793 to chamber 812 of relay 8.

Chamber 811 of relay 8 is connected by a conduit 428 to chamber 415 of relay 4 and thence connected by conduit 427 to positive feedback chamber 711.

Positive feedback chamber 711 has a movable wall such as flexible diaphragm 7111 connected at 741 to one end of rod 74 which is connected intermediate its ends at 742 to one end of rod 761.

Oscillator 1, whose construction and mode of operation is explained in detail in connection with Fig. 1, has an output pressure Pr. This output pressure Pr is fed through conduit 1121 to chamber 813 of relay 8. The force of pressure Pr in chamber 813 opposes the force of springs 84 and 892 and is re-enforced by the force of spring 872.

When the force of pressure Pr plus the force of spring 872 is greater than the force of spring 84 and the force of spring 892, plug 893 is moved off its stationary seat 893. This causes valve 89 to open communication between chambers 815 and 816. When the force of pressure Pr plus the force of spring 872 is less than the force of spring 84 both valves 87 and 89 remain in engagement with their valve seats. Thus communication between chambers 815 and 816 and communication between chamber 811 and 812 is cut off. When the force of pressure Pr plus the force of spring 872 is less than the force of spring 84, valve plug 871 is moved into contact with its stationary valve seat 873. This closes off communication between chambers 812 and 811.

Fig. 4 shows the construction of the pulse converter 3 and in connection therewith the mode of operation is explained. The pressure Pr is fed through conduits 322, and 3151 to chamber 413 of relay 4. Pulse converter 3 converts the pressure Pr fed to it through conduit 321 to an output pressure Pr' which is fed through conduit 3141 and to chamber 412 of relay 4. When the force of pressure Pr plus the force of spring 44 is greater than the force of pressure Pr', valve 48 is moved to open communication between chambers 411 and 414 because valve stem 481 is moved in a direction to lift the upper end of bore 482 off the lower face of valve plug 491. When the force of pressure Pr' is strong enough to overcome the force of pressure Pr plus the force of spring 44 plus the force of spring 492, valve plug 491 is moved off its stationary seat 493. This opens communication between chambers 414 and 415 of relay 4.

The operation of the device shown in Fig. 9 is as follows. Fig. 7 shows that the output pressure Pr of the oscillator 1 is a triangular wave when plotted against time. Fig. 4 shows that pressure Pr is fed to chamber 315 of pulse converter 3 through conduit 322 and to chamber 313 of pulse converter 3 through conduit 321. Pulse converter 3 converts a portion of pressure Pr into an output pressure Pr'. Pressure Pr' is fed through conduit 3141 to chamber 412 of relay 4. Relay 4 is therefore operated by the difference between the pressures Pr and Pr'. As pressure Pr decreases, the difference in pressure (Pr minus Pr') is also triangular or saw-tooth in shape when plotted against time. This triangular wave (Pr minus Pr') causes valves 48 and 49 to be alternately placed in communicating and non-communicating position, i.e., on and off. When valve 48 is in communicating position and valve 49 is in non-communicating position, the output pressure Pn from relay 77 is fed from chamber 411 to chamber 414 and thence to hollow chamber 423 and relay 781. When valve 48 is in non-communicating position and valve 49 is in communicating position, pressure Pn' is fed from chamber 414 through valve 49 to chamber 415 whence it passes through conduit 427 to positive feedback chamber 711 and through conduit 428 to chamber 811 of relay 8. This alternate placing of valves 48 and 49 in communicating and non-communicating position causes the positive feedback pressure Pp to build up. This is repeated a desired number of times until the positive feedback pressure Pp is built up to the desired amount. At the end of this multiplication period, valve 87 is placed in communicating position. This opens communication between chambers 811 and 812 of relay 8 and causes positive feedback pressure Pp to equal the reference pressure Pc. Simultaneously, valve 89 is placed in communicating position. This opens communication between chambers 815 and 816 of relay 8 and causes output pressure Po to equal the negative feedback pressure Pn' in hollow chamber 423. Valves 87 and 89 are only in communicating position for a short period of time. After this short period of time, the valves 87 and 89 are placed in a non-communicating position and the multiplying cycle is repeated.

Fig. 10 shows a pneumatic circuit which may be added to the device as shown in Fig. 9 to provide throttling range or proportional band adjustment.

This pneumatic circuit comprises a conduit 901 by means of which the output pressure Po is applied to a one-to-one relay 902.

Relay 902 comprises a control chamber 903 and an output chamber 904, separated by a pair of movable walls or diaphragms 907 of equal size. An inlet valve 905 and an exhaust valve 906 are actuated by the movable walls 907 and are interlocked so that only one of these valves can be opened at a time.

The output pressure from chamber 904 is led through conduit 908 to a manually adjustable restriction 909, such as a needle valve, controlled by a handle 910.

The output side of restriction 909 is connected by conduit 911 to a hollow chamber 912 which is connected by conduit 798 to the input chamber of relay 791.

From the foregoing it will be seen that this circuit comprises in effect a resistance-capacitance pneumatic circuit. Such a circuit operates analogously to an electric, voltage-divider circuit with the result that the reference pressure Pc' becomes a floating reference for the system. A floating reference may be defined as one which varies in its value.

Fig. 11 shows a device in which the three modes of controller operation (i.e. proportional, rate, and reset) can be obtained by the use of rapidly opening and closing valves or pulse technique. This permits each of these controller adjustments or modes of operation to be adjusted from a distance by the use of air transmitters.

Fig. 11 shows a measuring element M having pivotal connection with a flapper F so that variations of the process variable cause the measuring element M to move flapper F relative to a nozzle N and thereby vary the pressure of a supply of air from a source F.A.S. through a restriction R and inlet chamber 1023. This air pressure Pv is fed through a conduit 6161 to a sampling or switching relay 6.

Relay 6 comprises a rigid case 61 divided into seven chambers 611, 612, 613, 614, 615, 616, and 617 by four flexible walls and two rigid walls.

Relay 6 contains three valves, generally designated 68, 69, and 70 which are normally off.

Valve 68 includes a plug 681 biased by a spring 682 into engagement with a stationary valve seat 683 forming the rim of an orifice in the rigid wall that separates chambers 616 and 617.

Valve 69 includes a plug 691 biased by spring 692 into engagement with a valve seat 693 which forms the rim of an orifice through the rigid wall which seperates chambers 611 and 612.

Valve 70 includes a valve stem 701 having an orifice 702 extending axially thereof. The upper end 703 of orifice 702 normally engages with the underside of plug 691. The lower end 704 of orifice 702 is in open communication with chamber 615.

Valve stem 701 is mounted in casing 61 by actuating diaphragm 63 and sealing diaphragms 631, 632, and 633.

Spring 64 biases diaphragm 63 and the parts connected thereto against pressure of the air in chamber 613.

The operation of relay 6 is as follows. Air at a varying pressure is conducted to chamber 613 from oscillator 1 or pulse sampler 3 by inlet conduit 6131. If the force of the pressure of the air in chamber 613 is sufficient to overcome the force of spring 64 plus the force of spring 682, valves 70 and 68 are on because valve stem 701 is moved so that the upper end 703 of bore 702 disengages plug 691 and opens communication between chambers 612 and 615. At the same time, the lower end 705 of valve stem 701 engages plug 681 and moves plug 681 off its seat 683 against the bias of spring 682. This opens communication between chambers 616 and 617.

If the force of the pressure of the air in chamber 613 plus the force of spring 692 is not sufficient to overcome the force of spring 64, valve 69 is on. Spring 64 keeps valve 70 off but forces valve 69 on by moving plug 691 away from its stationary seat 693 so as to open communication between chambers 611 and 612.

Oscillator 1 sends out air at a cyclically varying pressure through a conduit 6131 to a motor chamber 613. The variations of the pressure of the air in chamber 613 actuates movable member or diaphragm 63 and thereby actuates first valve 68, second valve 69, and third valve 70. Valves 68, 69, and 70 are thereby rapidly moved to on or off. The output of relay 6 is conducted to a controller, generally designated 10.

Between the off-going side of valve 69 and the on-coming side of valve 68 is connected a one-to-one relay, generally indicated 1022. Relay 1022 is divided into chambers 1023 and 1024 by flexible diaphragms 1025 which have interlocking engagement with inlet valve 1027 and with exhaust valve 1026. The pressure in chambers 1023 and 1024 is designated $Pv''$.

Controller 10 is of the stack type and comprises a case 101 which is divided into nine chambers 102, 103, 104, 105, 106, 107, 108, 109, and 1010 by flexible walls 1011, 1012, 1013, 1014, 1015, 1016, 1017, 1018. A rod 1019 is located axially of case 101 and is mounted on the flexible diaphragm. Rod 1019 carries a flapper 1020 on it. Flapper 1020 cooperates with a stationary nozzle 1021.

The off-going side of valve 70 is connected by conduit 6151 to chamber 1010. The pressure of the air in chamber 1010 is designated $Pv'$. The off-going side of valve 68 is connected by conduit 6171 to chamber 108. The pressure of the air in chamber 108 is designated $Pv'''$.

Nozzle 1021 is connected by pipe 765 to a relay, generally designated 77. Relay 77 comprises chambers 771, 772, and 773 divided by two flexible diaphragms 774 and 776 connected together by a rod 775. Diaphragm 776 has interlocking engagement with inlet valve 777 and with exhaust valve 778. This interlock is so arranged that but one of these valves can be on at one time, while the other is off. The conduit 78 connects the chamber 773 with chamber 106 of controller 10. Chamber 106 is the negative feedback chamber of controller 10. The pressure of the air in chamber 106 is designated $Pn$.

A conduit 825 connects chamber 106 with the motor of the final control valve F.C.V. The pressure which actuates this final control valve is designated $Po$.

Branching from conduit 825 is a conduit 4111 which connects the output of the controller 10 and the final control valve F.C.V. with the input to a switching or sampling relay 4.

The details of the construction and mode of operation of relay 4 have been explained in connection with Fig. 9.

As diagrammatically illustrated in Fig. 11, oscillator 1 has an output conduit 1121 which has two branches 322 and 321 which lead to a pulse converter 3. Pulse converter 3 has two output conduits 3141 and 3151 which lead to the opposite sides of diaphragm 43 in relay 4. Any difference in the pressure of the air on the opposite sides of diaphragm 43 actuates valves 48 and 49. Thus, during each sampling period, the valves 48 and 49 are rapidly moved on and off.

Negative feedback chamber 106 is connected by conduits 825, 4111, and chamber 411 to the on-coming side of fourth valve 48. The off-going side of valve 48 is connected by conduit 4141 with a first, storage chamber 1029 and with chamber 414 which forms the on-coming side of fifth valve 49. The off-going side of valve 49 is connected by conduit 4910 to the positive feedback chamber 102 of controller 10. The pressure of the air in chamber 1029 is designated $Pn'$.

A sampling or switching relay, generally designated 8, is connected to the positive feedback chamber of controller 10 and, by conduit 4141 to chamber 1029. The details of the construction and mode of operation of relay 8 have been explained in connection with Fig. 9.

As diagrammatically illustrated in Fig. 11, oscillator 1 has a branch of output conduit 1121 which communicates with chamber 813 in relay 8. The cyclically varying air pressure put out by oscillator 1 and applied by chamber 813 to diaphragm 83 causes sixth valve 87 and seventh valve 89 to move rapidly and alternately on and off.

The off-going side of valve 89 is connected by conduit 798 to a one-to-one relay, generally designated 791. Relay 791 comprises chambers 792 and 793 divided by diaphragms 795 of equal size which have interlocking connection with inlet valve 796 and exhaust valve 797. This interlock is such that but one of the valves 796 or 797 can be on at one time while the other is off. Chamber 793 is connected by pipe 821 to chamber 812 which forms the off-going side of valve 87. Pipe 798 also connects to a chamber 1028. The pressure of the air in chamber 1028 is designated $Pc$. The diaphragms of the chambers of controller 10 are sized so that a balance of forces is maintained by feedback action at every instant of time. The volume of the closed, storage chambers 1028 and 1029 is equal to the volume of the positive feedback chamber 102. The gain or proportional band of the controller 10 is determined by the number of times valve 48 is on during the multiplication period.

Figure 14:
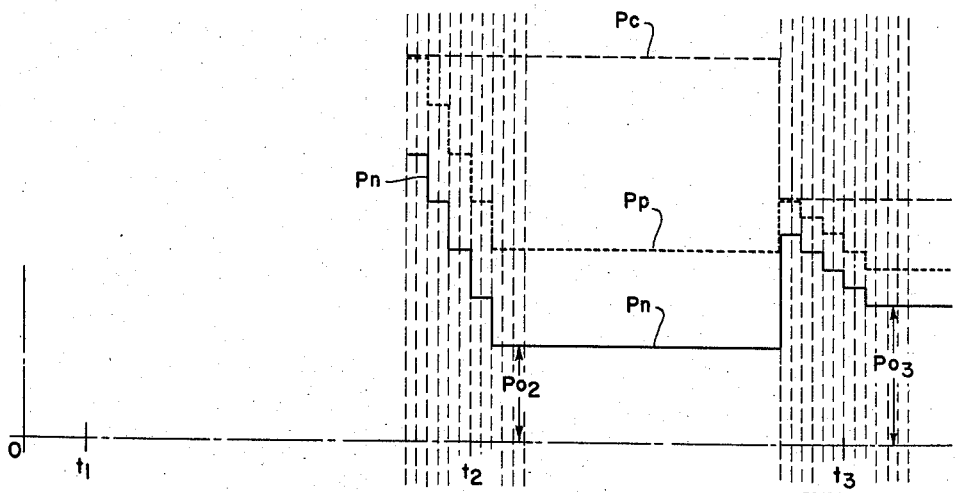
Fig. 14 is a graph of three pressures $P_n$, $P_p$, and $P_c$, hereinafter referred to, plotted against time.

An understanding of the mode of operation of the device shown in Fig. 11 is aided by Figs. 12, 13, and 14. Fig. 12 shows the multiplication period referred to above as the time between $t_c$ and $t_e$. The total sampling period, shown in Figs. 12, 13, and 14 as $t_a$ to $t_g$, is very much smaller than the interval between each sampling period and the next, succeeding, sampling period.

Fig. 12 is a diagram in which the values of the output pressure $Pr$ of the oscillator 1 are plotted on a vertical axis against time as a horizontal axis. The positions of the movable members or valves 68, 69, 70, 87, 89, 48, and 49 are indicated on the same time axis as is pressure $Pr$ but on an arbitrary vertical axis showing whether the valves are on or off.

Fig. 13 is a diagram showing $Ps$, $Pv$, $Pv'$, $Pv''$, and $Pv'''$ plotted on different, vertical axis against time as the common, horizontal axis. An arbitrary upset in the process variable is assumed. The values which the process variable pressure $Pv$ takes at various instances of time are designated by the legend $Pv1$, $Pv2$, and $Pv3$. The values which the process variable pressure $Pv'$ in chamber 1010 take at the various instants of time are designated by the legends $Pv'1$, $Pv'2$, and $Pv'3$. The values which the process variable Pv″ in chambers 1023 and 1024 takes at various instants of time are designated by the legend Pv″1, Pv″2, and Pv″3. The various values which the process variable pressure Pv‴ in chamber 108 takes at various instants of time are designated by the legends Pv‴1 and Pv‴2.

Fig. 14 is a diagram plotted on the same horizontal, time axis as Fig. 13 and in which the reference pressure Pc in chamber 1028 is plotted as a dashed line, the negative feedback pressure Pn in chamber 106 is plotted as a solid line, and the positive feedback pressure $P_p$ in chamber 102 is plotted as a dotted line. The variations in the pressures Pc, Pn, and $P_p$ cause a variation in the output pressure Po. The values which this output pressure Po assumes at various periods of time are designated by the vertical distances Po2 and Po3.

Fig. 15 shows a modified form of oscillator, generally indicated 17, which is actuated with a "snap" action solely by the air pressures in it and which has no flexible, metal diaphragm corresponding to diaphragm 15 of Fig. 1.

Oscillator 17 comprises a rigid case 171 divided into three chambers 172, 173, and 174 by movable walls 175 and 176 and by rigid wall 177.

Inlet chamber 173 has a small volume relative to motor chamber 172. A supply of compressed air F.A.S. is connected by a pressure regulator 180 and a manually-operable restriction 181 to inlet chamber 173. A second, manually-operable restriction 182 is connected between inlet chamber 173 and motor chamber 172. A off-take connection 183 leads off the output pressure Pr from chamber 172 and restriction 182.

An exhaust valve 18, comprising a plug 184 biased by a spring 185 into engagement with valve seat 186, is located between inlet chamber 173 and exhaust chamber 174, which is vented to atmosphere. Rod 19 connects walls 175 and 176 together.

The operation of regulator 17 is as follows. When the pressure in chambers 172 and 173 is the same as the atmosphere, valve 18 is closed. Restriction 181 is then opened a desired amount. Chamber 173 being small, fills quickly since valve 18 is closed. Chamber 172 fills more slowly, being larger and because of restriction 182. Since wall 175 is larger than wall 176, when the pressure of the air in chamber 172 reaches a selected ratio to the pressure of the air in chamber 173, valve 18 is opened by rod 19 since the pressure on wall 175 is greater than the pressure on wall 176 plus the bias of spring 185.

Opening valve 18 causes chamber 173 to empty rapidly. Thereafter, the pressure of the air in chamber 172 decreases slowly by bleeding through restriction 182. When the pressure of the air in chamber 172 again reaches the selected ratio to the pressure of the air in chamber 173, valve 18 closes.

This cycle repeats itself so that the pressure Pr put out by oscillator 17 varies in a regular cycle which appears triangular when plotted against time.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. Means for varying the pressure of a supply of air in a cycle including a maximum and a minimum and for repeating this cycle, including, a chamber, an inlet valve controlling the supply of air to said chamber, an exhaust valve controlling the escape of air from said chamber, a manually adjustable restriction connected between said chamber and said valves, a movable member forming a wall of said chamber and exposed on one surface to the pressure of the air in said chamber, means biasing said movable member against the pressure of the air in said chamber, an interlock between said movable member and said valves whereby said movable member holds one of said valves in on position when the pressure in said chamber is greater than the force of said bias means and holds the other valve in off position and vice versa, and a spring biasing said movable member and said interlock towards its extreme positions of travel and away from its intermediate position of travel.

2. Means according to claim 1 in which said biasing means is a second chamber having a movable wall connected to said interlock so that the pressure on one face of said second movable member biases said interlock against the pressure in said first mentioned chamber.

3. A pneumatic oscillator and amplifier, including, a chamber, an inlet valve controlling the supply of air to said chamber, an exhaust valve controlling the escape of air from said chamber, a restriction connected in series with at least one of said valves and serving to control the flow of air through said valve, a movable member forming a wall of said chamber and exposed on one face to the pressure of the air in said chamber, an interlock connected between said movable member and said valves whereby said movable member holds one of said valves in on position when the pressure in said chamber is greater than the bias on said movable member and holds the other of said valves in off position and vice versa, a spring biasing said movable member and said interlock towards either end position of its path of travel and away from the intermediate position in its path of travel, a second chamber adapted to receive a supply of air under pressure therein, a second movable member forming a wall of said second chamber and connected to said interlock and to said first movable member to move them in opposition to the pressure of the air in said first chamber, a flapper-nozzle valve, a third movable member forming a second wall of said second chamber and having operative engagement with said flapper-nozzle valve, a third chamber, a fourth movable member forming a wall of said third chamber and having engagement with said flapper-nozzle valve to move it in the opposite direction in which said flapper-nozzle valve is moved by said third movable member, a conduit for air connecting said first chamber and said third chamber, a fourth chamber, a fifth movable member forming a wall of said fourth chamber, a conduit connecting said flapper-nozzle valve to said fourth chamber so that the flapper-nozzle valve governs the pressure of the air in said fourth chamber, a fifth movable member forming a wall of said fourth chamber, a sixth chamber, a second inlet valve governing communication between a supply of air and said sixth chamber, a second outlet valve governing the exhaust of air from said sixth chamber, and means for actuating said second inlet valve and said second outlet valve from said fourth movable member.

4. A pneumatic oscillator and pneumatic amplifier according to claim 3 having a manually operable restriction in the conduit between said first chamber and said fourth chamber.

5. Means for varying the pressure of a supply of air in a cycle including a maximum and a minimum and for repeating this cycle, including, an inlet restriction adapted for connection on its inlet side to a supply of air under pressure, a first chamber of relatively small volume connected to the off-going side of said restriction, an exhaust valve controlling the escape of air from said first chamber, a second chamber of relatively large volume, a second restriction connecting said chambers, a movable member having relatively small effective area and forming a wall of said first chamber, a second movable member having a relatively large effective area and forming a wall of said second chamber, and an interlock connecting said movable members and adapted to hold said valve on when the pressure in said first chamber is at less than a predetermined ratio to the pressure in said second chamber and to hold said valve off when the pressure in said first chamber is at more than a predetermined ratio to the pressure in said second chamber.

6. An air-pressure-operated, force-balanced, three-mode-controller having sampling or pulsing actuation, including, a rigid case enclosing a plurality of chambers each having a movable member forming a wall thereof, said chambers including a first process variable chamber whose movable member is operable in one sense in response to a given change in pressure of the air in said chamber, a second process variable chamber operable in the opposite sense, a set point chamber operable in the opposite sense, a negative feedback chamber operable in the opposite sense, and a positive feedback chamber operable in said one sense, a flapper-nozzle valve operable in response to the resultant of the operations of said movable members to control the pressure of a supply of air, a first valve adapted to be connected at its inlet side to a supply of air under pressure varying in response to the variations in a process variable and connected at its outlet side to said first process variable chamber, a second valve connected at its inlet side to the outlet side of said first valve and to said first process variable chamber and connected at its outlet side to said second process variable chamber, a third valve connected at its inlet side to the air controlled by said flapper-nozzle valve and is adapted to be connected at its outlet side to the motor for a final control valve, a fourth valve connected at its inlet side to the outlet side of said third valve and to said motor and connected at its outlet side to said negative feedback chamber, an oscillator operable to vary the pressure of a supply of air in a cycle including a maximum and a minimum and to repeat this cycle, and air-pressure-operable mechanism connecting said oscillator to each of said valves, whereby each of said valves is opened and closed rapidly in repeated cycles to vary the flow of air through said valve.

7. A controller according to claim 6 in which there is connected a hollow chamber between said first valve and said first process variable chamber.

8. A controller according to claim 6 in which there is a hollow chamber connected on its inlet side to the outlet side of said third valve and to the inlet side of said fourth valve and adapted to be connected on its opposite side to the motor for the final control valve.

9. An air-pressure-operated, force-balanced relay having sampling or pulsing actuation and having means for adjusting the ratio of its input to its output, including, a flapper-nozzle valve controlling the pressure of a supply of air, an input member actuating said flapper in one sense, a rigid case closing a pair of chambers each having a movable member forming a wall thereof, said chambers including a negative feedback chamber whose movable member is connected to said flapper to operate it in the opposite sense in response to the pressure of the air in said negative feedback chamber and a positive feedback chamber whose movable member is connected to said flapper to operate said flapper in said one sense in response to the pressure of the air in said positive feedback chamber, a conduit connecting said negative feedback chamber to a supply of air at a pressure controlled by said flapper-nozzle valve, a first valve connected on its inlet side to said supply of air and to said negative feedback chamber, a closed chamber having a volume equal to the volume of said positive feedback chamber and connected to the outlet side of said first valve, a second valve connected on its inlet side to the outlet side of said first valve and to said chamber and connected on its outlet side to said positive feedback chamber, a third valve connected on its inlet side to a supply of air controlled by the pressure of the air in said closed chamber and adapted to be connected on its outlet side to the motor for the final control valve, a fourth valve connected on its inlet side to a supply of air at a reference pressure and connected on its outlet side to said positive feedback chamber, an oscillator operable to vary the pressure of a supply of air in a cycle including a maximum and a minimum and to repeat this cycle, air-pressure-operated mechanism operated by said oscillator and operating said third and fourth valves to open and close them rapidly in a repeated cycle, and a pulse converter operable to vary the pressure of a supply of air in a cycle including a maximum and a minimum and to repeat this cycle, a conduit connecting said pulse converter under the control of said oscillator, an air-pressure-operated mechanism connecting said pulse converter to said first and second valves whereby said first and second valves are opened and closed rapidly in a repeated cycle.

10. A relay according to claim 9 in which there is a second storage chamber connected between the outlet of said third valve and the motor of the final control element.

11. A relay according to claim 9 in which said pulse converter comprises a rigid case divided into five chambers by flexible and rigid walls, an actuating diaphragm forming one of said flexible walls and separating two of said chambers, a first pulse converter valve mounted on and actuated by said diaphragm and controlling the communication between an inlet chamber and an outlet chamber, said chambers on the opposite sides of said diaphragm, a spring biasing said valve to off, a second pulse converter valve controlling communication between a second inlet chamber and said outlet chamber, a spring biasing said second valve to off, and manually adjustable means for adjusting the bias of said spring.

12. A relay according to claim 9 including air-pressure-operated means for adjusting the proportional band, including, a second storage chamber connected between the outlet of said third valve and the motor for the final control element, a one-to-one relay connected on its inlet side to said second storage chamber, a manually operable restriction connected to the outlet side of said one-to-one relay, and a reference-pressure-storage chamber connected between the outlet of said restriction and the inlet side of said fourth valve.

13. An air-pressure-operated, force-balanced, three-mode controller having sampling or pulsing actuation, including, a rigid case enclosing a plurality of chambers each having a movable member forming a wall thereof, said chambers including a first process variable chamber whose movable member is operable in one sense in response to a given change in pressure of the air in said chamber, a second process variable chamber operable in the opposite sense, a set point chamber operable in the opposite sense, a negative feed back chamber operable in the opposite sense, and a positive feedback chamber operable in said one sense, a flapper-nozzle valve operable in response to the resultant of the operations of said movable members to control the pressure of a supply of air, a first valve adapted to be connected at its inlet side to a supply of air under pressure varying in response to variations in a process variable and connected at its outlet side to said first process variable chamber, a second valve adapted to be connected at its inlet side to a supply of air under pressure varying in response to the variations in a process variable, a one-to-one relay having its inlet chamber connected to the outlet side of said second valve, a third valve having its inlet side connected to the outlet chamber of said one-to-one relay and having its outlet side connected to said second process variable chamber, a fourth valve connected at its inlet side to a supply of air varied by said flapper-nozzle valve and to said negative feedback chamber and adapted to be connected to the motor for a final control valve, a storage chamber having the same volume as said positive feedback chamber and connected to the outlet side of said fourth valve, a fifth valve connected at its inlet side to the outlet side of said fourth valve and to said storage chamber and connected at its outlet side to said positive feedback chamber, a seventh valve connected at its inlet side to the outlet side of said fourth valve and to said storage chamber and to the inlet side of said fifth valve, a second one-to-one relay connected at its inlet side to the outlet side of said seventh valve, a sixth valve connected at its inlet side to the outlet side of said second one-to-one relay and at its outlet side to said positive feedback chamber, an oscillator operable to vary the pressure of a supply of air in a cycle including a maximum and a minimum and to repeat this cycle, and air-pressure-operable mechanism connecting said oscillator to each of said valves, whereby each of said valves is opened and closed rapidly in repeated cycles to vary the flow of air through said valves.

14. A controller according to claim 13, including, a second storage chamber having the same volume as said positive feedback chamber and connected to the outlet side of said seventh valve and to the inlet side of said second one-to-one relay.

15. Means for varying the pressure of a supply of air in a cycle including a maximum and a minimum and for repeating this cycle, including, a chamber an inlet valve controlling the admission of air to said chamber, an outlet valve controlling the exhaust of air from said chamber, a movable member forming a wall of said chamber and exposed on one face to the pressure of the air in said chamber and having an inherent bias away from its mid-position so as to move said valves with a snap action, a spring biasing said member for movement in the opposite direction, and an interlock between said member and said valves whereby said member holds one of said valves on and the other of said valves off when the pressure in said chamber is greater than said bias and vice versa.

References Cited in the file of this patent

UNITED STATES PATENTS

| | | |
|---|---|---|
| 2,013,222 | Thomas | Sept. 3, 1935 |
| 2,651,468 | Joesting | Sept. 8, 1953 |